United States Patent [19]

Persons

[11] Patent Number: 4,636,007
[45] Date of Patent: Jan. 13, 1987

[54] WHEEL HUB WITH LUBRICATION FITTINGS

[76] Inventor: Thomas H. Persons, 3200 Quarles Rd., Brooklyn Center, Minn. 55429

[21] Appl. No.: 773,183

[22] Filed: Sep. 6, 1985

[51] Int. Cl.$^4$ .............................................. B60B 27/00
[52] U.S. Cl. .................... 301/105 R; 384/474
[58] Field of Search ............... 384/473, 474, 475; 301/6 WB, 105 R, 108 R, 109, 124 R, 125

[56] References Cited

U.S. PATENT DOCUMENTS

| | | | |
|---|---|---|---|
| 1,748,198 | 2/1930 | Van Wormer | 301/109 X |
| 2,514,799 | 7/1950 | Ruberfino et al. | 384/474 |
| 2,770,507 | 11/1956 | Ehnts | 384/474 |
| 3,077,948 | 2/1963 | Law | 301/108 R X |
| 3,642,327 | 2/1972 | Walther | 301/108 R |
| 3,649,080 | 3/1972 | Molinare | 301/108 R |
| 4,190,133 | 2/1980 | Ploeger | 301/108 R X |

FOREIGN PATENT DOCUMENTS 689483  3/1953  United Kingdom ............... 384/474

Primary Examiner—David A. Scherbel
Attorney, Agent, or Firm—Douglas L. Tschida

[57] ABSTRACT

Apparatus mounting to the bearing containing hub of a wheeled vehicle and accessible from the front of each wheel for lubricating the inner and outer wheel bearings. A first zerk fitting and pressure relief valve coupled to the outside of the hub assure the lubrication of the outer bearing. A second zerk fitting mounting through the wheel rim and backing plate and opening to a grease conveying channel at the interior or the hub adjacent the inner bearing assure the lubrication thereof. In various alternative embodiments, the grease conveying channel is incorporated into appurtenant lug bolts, threaded studs, hollow wheel cavities and tubular extensions.

7 Claims, 4 Drawing Figures

WHEEL HUB WITH LUBRICATION FITTINGS

BACKGROUND OF THE INVENTION

The present invention relates to wheeled vehicles and in particular to trailered vehicles and the inclusion of means therewith for externally greasing the inner and outer wheel bearings of each wheel without removing the bearings.

One problem faced by the trailer owner is that of failed wheel bearings and axles and which arise from insufficient lubrication. This problem is of particular concern to the fisherman, in that with the insertion and removal of the trailer from the water, especially when the wheel bearings and grease are hot, the wheel grease tends to wash from the wheel hub and/or water is trapped in the hub with resulting rusting and accelerated wear. The rental trailer industry also shares in this problem, but there it is a consequence of protracted maintenance cycles. The resulting shortage of lubricant causing higher operating temperatures and resultant bearing failure. Some of the results in either case being worn bearings, pitted bearing races and/or possibly damaged wheel hubs, requiring the replacement thereof and/or oftentimes the replacement of the wheel's entire backing plate.

In order to alleviate the foregoing problems, a number of devices have been developed and which are disclosed in a number of U.S. Patents, for example, U.S. Pat. Nos. 3,077,948; 3,395,015; 3,649,080; 3,395,950; 3,955,852; 4,106,816; and 4,190,133. A feature common to each of the foregoing devices is that of including a zerk fitting in a special dust cap that mounts over the wheel hub and axle end. Grease injected into the grease fitting then permeates through the entire hub to grease the inner and outer bearings. In practice, however, with the buildup of old grease, this oftentimes does not occur and instead the new grease tends to build up in the region of the outer bearing, with no grease permeating to the inner bearing. Also and where water has leaked into the hub, as the old grease and water is forced out of the hub with the addition of new grease, it tends to ruin the inner grease seal. Thus, wheel failure tends to occur at the inner bearing and race.

Two attempts to overcome this problem can be seen in U.S. Pat. Nos. 3,460,874 and 3,642,237 and wherein zerk fittings have been mounted in the projecting external portion of the wheel hub itself and which ostensively permits the introduction of grease in between the bearings. Again, however, as the grease ages, one is not always certain that the newly injected grease will migrate to each of the wheel bearings, but may rather only collect in the middle region opposite the internal sides of the two bearings.

It is for the foregoing reasons that the present invention contemplates a modification of a conventional wheel hub and backing plate to permit the application of grease directly at each of the inner and outer bearings and thereby ensure proper bearing lubrication and the prolongation of the wheel's life. It achieves this end by providing grease ports that are accessible from the front of the wheel, but which channel the grease to the inner and outer bearings.

The above objects, advantages and distinctions, as well as the construction of the present invention, will however be described in greater detail hereinafter with respect to the appended drawings. Before referring thereto, it is to be recognized though that the following description is made with respect to the presently preferred embodiment only and is not intended to in any way be self-limiting.

SUMMARY OF THE INVENTION

Apparatus for lubricating the bearings of a wheeled vehicle directly at the front and rear bearings without removing the bearings from the wheel. In one embodiment, the apparatus includes a zerk fitting mounted along the elongated outer wall of the wheel hub adjacent the front or outer bearing. In diametrically opposed relation thereto, a pressure relief valve is mounted and which completes the flow path and assures unimpeded flow of lubricant to the outer bearing. A second zerk fitting extends through the wheel rim and backing plate to a grease channel containing weldment mounted to the backing plate, and wherein the grease channel opens to the rear or inner bearing. An appurtenant pressure relief valve containing weldment mounted in diametrically opposed relation to the second inlet fitting assures grease flow to and about the inner bearing. The invention is thus mountable to any wheeled vehicle, either as manufactured or in a retrofit fashion.

In another embodiment, and in lieu of a stamped steel hub, a cast metal hub includes a hollow chamber in flow communication with a zerk fitting containing a bored lug bolt. Grease may thereby be directed through the lug bolt and chamber to an inlet port adjacent the inner bearing. A pressure relief channel opposite the inlet port and passing through a second hollow chamber and lug bolt, complete the flow path.

In yet another embodiment, a brake drum assembly contains a pair of press fit studs and wherein each stud has a zerk fittng mounted in a longitudinal bore therethrough. A hollow tube connected to the other end of one of the studs couples admitted grease to an inlet port through the hub adjacent the inner wheel bearing. An opposed outlet port coupled to a second tube and the other stud provide a pressure relief path.

DESCRIPTION OF THE PREFERRED EMBODIMENT

Figure 1:
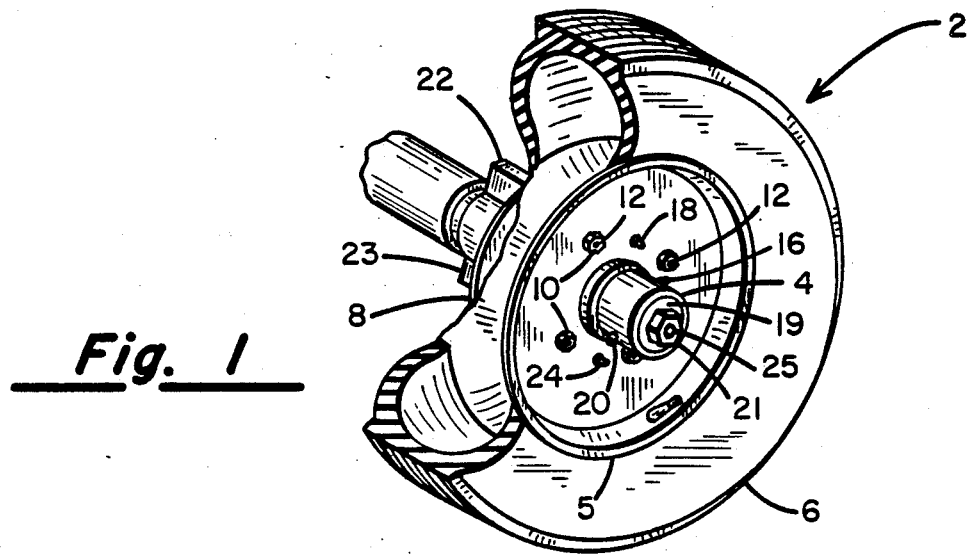
FIG. 1 shows a perspective view of the invention in partial cutaway in a typical wheel hub and backing plate relative to a wheel and tire.

Referring to FIG. 1, a partially sectioned perspective view is shown of a typical trailer wheel 2 and mating wheel hub 4 that has been modified to include the present invention. Before addressing the details thereof, however, it is to be recognized that the present invention would typically be included with each wheel hub 4 of a vehicle. Consequently and since the construction would be similar for each other wheel, the following description will be directed to a single hub only.

Accordingly, FIG. 1 depicts a conventional wheel rim 5 and to which is mounted a tire 6 of an appropriate size. The wheel rim 5 is mounted to the wheel hub 4 and its associated backing plate 8 via a plurality of lug nuts 10 that are threadably secured to a number of press fit studs 12 which project from the backing plate 8. Alternatively, it is to be recognized that a number of lug bolts that mate with a number of threaded holes in the backing plate 8 might be used to secure the wheel 5 to the backing plate 8. A dust cover (not shown) mounted to the end of the wheel hub 4 protects the interior of the hub 4 from dirt and other debris that might otherwise accumulate and/or find its way into the hub 4 with deleterious effects to the bearing and/or axle 25 contained therein. As mentioned and for a boat trailer, a particular concern is that after towing the boat to a launching site and upon backing the trailer into the water and launching the boat, the lubricant can wash away and/or water can become trapped in the hub.

In order to overcome this problem and ensure that sufficient lubricant is maintained in the cavity of the wheel hub 4, a pair of inlet zerk fittings 16 and 18 are mounted to the wheel hub 4 and backing plate. Specifically, a first inlet zerk fitting 16 is mounted to the exposed outer portion of the hub 4 adjacent the front or outer bearing (not shown). In diametrically opposed relation thereto, a zerk-type pressure relief valve 20 is also mounted to the hub 4. Thus, upon injecting grease into the zerk fitting 16, the grease collects inside the hub 4 around the outer bearing and upon filling the space, the old grease is pushed through the pressure relief valve 20. This condition indicating that sufficient lubricant has been injected. Alternatively, grease may ooze from around the outer washer 19 and castellated nut 21, that hold the front bearing in place relative to the axle 25, and which condition also demonstrates proper lubrication.

The second inlet zerk fitting 18 is mounted through a hole 19 in the wheel rim 2 and is threadably coupled to the backing plate 8 and a standoff or weldment 22 that is secured thereto. This fitting permits the further lubrication of the rear or inner wheel bearing. Specifically, the weldment 22 includes an internal grease conveying channel (not shown) that terminates at a port adjacent the inner bearing. A further ported channel in a second diametrically opposed weldment 23 opens from the wheel hub 4 and terminates in a pressure relief valve 24. Thus, upon injecting grease through the zerk fitting 18, it fills the interior of hub 4 and the space around the inner wheel bearing. At the same time the old grease is pushed through the pressure relief fitting 24. Consequently, the present invention not only permits the greasing of each wheel's outer wheel bearing, but also the inner wheel bearing, without removing the bearings from the wheel.

As previously mentioned, the prior art principally provides for a modified dust cover, including a zerk fitting and pressure relief valve. In theory, an operator is supposed to be able to inject grease at the zerk fitting and be assured that due to the pressure of the grease gun, the grease will flow through the front bearing to completely fill the wheel hub and thereby also lubricate the rear bearing. Concurrently, old grease will ooze from a relief valve in the dust cover. While this may occur with the first greasing of the wheel hub 4, as the wheel grease ages and hardens, more often than not, it has been found that the fresh grease will not penetrate the front bearing to replenish the grease in the wheel hub. Rather, the grease only collects within the dust cover, adjacent the outer bearing, without lubricating the inner bearing.

Figure 2:
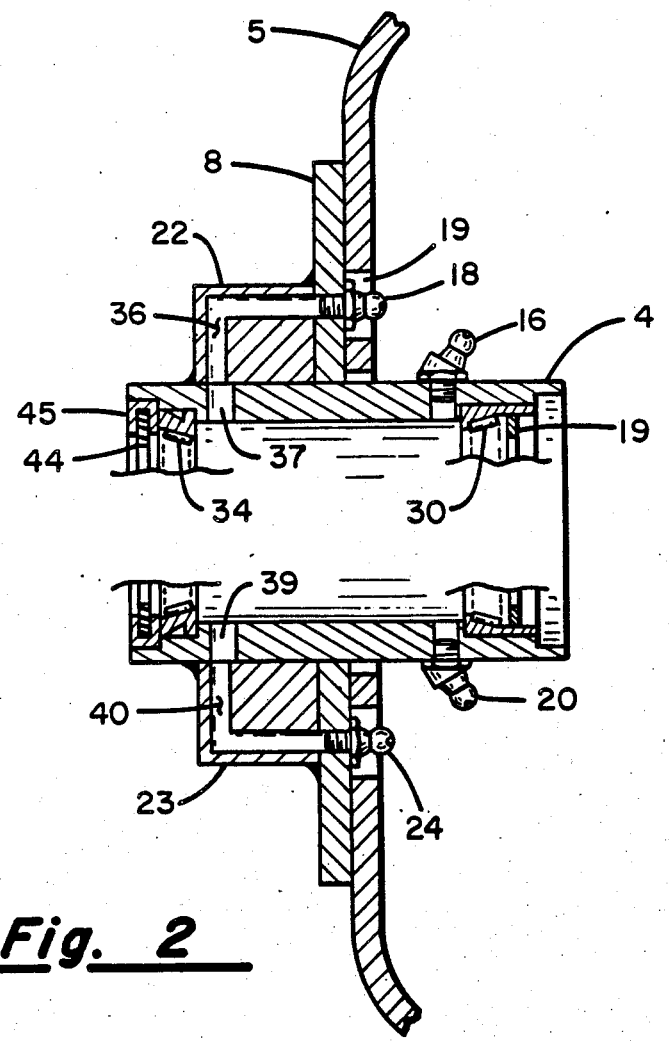
FIG. 2 shows a partial cross-section view of the wheel hub of FIG. 1.

Turning attention next to FIG. 2, a partial crosssection view is shown through the wheel 5 and hub 4 of FIG. 1. For purposes of clarity, however, the wheel studs 12, nuts 10, axle 25 and various other details have not been shown. From FIG. 2, it is to be noted that the zerk fitting 16 for the outer bearing 30 is mounted to the wheel hub 4 just back of the outer bearing 30. Similarly, the outer pressure relief valve 20, which comprises a zerk fitting with its innards removed, is mounted in opposed relation to the zerk fitting 16. The fittings 16 and 20 are in turn mounted to the hub 4 by boring and tapping appropriately sized holes through the wheel hub 4, before threadably securing each thereto. Upon injecting grease through the inlet zerk fitting 16, it collects inside the wheel hub 4 in surrounding relation to the axle 25 and outer wheel bearing 30. Once enough grease has collected to cause the interior pressure to rise, the residue begins to ooze from the relief valve 20.

The rear bearing 34, in turn, is greased via the channel containing weldments 22 and 23 secured to the backing plate 8 and the hub 4. The channel 36 in the upper weldment 22 is aligned with a hole bored and tapped through the backing plate 8 and the zerk fitting 18 is mounted thereto. The other end of the channel 36 is aligned with a hole 37 bored through the hub 4 adjacent the inner wheel bearing 34. The grease channel 40 of the opposed weldment 23 is similarly aligned at one end with a hole 39 bored through the bottom of the hub 4 and at the other end with a hole bored and tapped through the backing plate 8 and wherein a second pressure relief zerk-type valve 24 is mounted. Thus, upon injecting grease at the zerk fitting 18, it passes through the grease channel 36 and collects in the region adjacent the inner wheel bearing 34. An inner grease seal 44, surrounded by a press fit metal retainer 45 and mounting against the rear bearing 34 and about the axle 25, prevents the grease from being ejected therefrom. Instead, and once the interior of the hub 4 is filled, the grease is forced out through the channel 40, until it appears at the pressure relief valve 24.

While over time the grease may still harden and/or run from the wheel hub 4, now at least the operator has a readily available mechanism for ensuring proper lubrication to the outer and inner bearings 30 and 34, without having to remove the wheel 2 and individually repack the bearings of each wheel. Because of the time involved in the latter operation, the present invention finds particular savings to the rental trailer industry as well as to the fisherman. Now too the wheel bearings can be lubricated with relative ease and with the assurance of fewer costly breakdowns.

Figure 3:
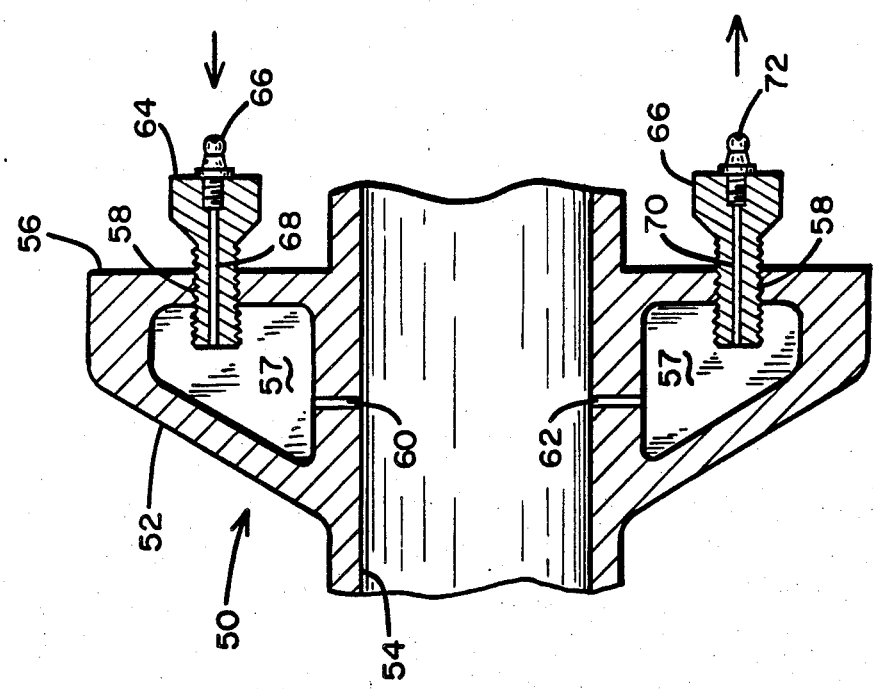
FIG. 3 shows a cross-section view of a cast backing plate and hub having molded grease conveying cavities and ported lug bolts opening thereto.

Turning attention next to FIG. 3, an alternative embodiment of the invention is shown in cross-section relative to a commercially available cast wheel hub/backing plate assembly 50 that includes a hub portion 54 and a backing plate portion 56. Extending rearwardly from the assembly 50 are a number of cast strengthening ribs 52 that extend between the backing plate portion 56 and the hub portion 54. These strengthening ribs 52 are typically radially disposed about the inner surface of the backing plate portion 56 and serve to support the backing plate portion 56 against encountered road stresses. As typically constructed, each rib 52 also includes a hollow interior cavity 57 that is unconnected to any other portion of the assembly 50.

For purposes of the present invention, the assembly 50 has been modified by re-positioning the threaded lug bolts 58 let through the backing plate portion 56 so that at least two of the holes 58 open up into the hollow cavities 57 of two of the strengthening ribs 52. Ports 60 and 62, in turn, are let through the hub portion 54 to the cavities 57 adjacent the space in the hub portion 54 whereat the inner bearing is positioned. Upon thus injecting grease into the upper hollow cavity 57, it is directed through the port 60 adjacent the inner bearing. Upon filling this space, the old grease is forced out through port 62 and the lower cavity 57.

In this latter regard, FIG. 3 also discloses the modification of two of the typical lug bolts used therewith. Specifically, the upper and lower lug bolts 64 and 66 have been modified to include longitudinal grease conveying bores 68 and 70. An inlet zerk fitting 66 mounted to the outer end of the upper bore 68 directs grease flow through the bore 68 and thence via the hollow chamber 57 and port 60 to the inner bearing.

A diametrically opposed pressure relief path is also provided. Specifically, the lower relief port 62 extends from the interior of the hub portion 54 to the lower hollow cavity 57 and thence to the second lug bolt 66 and via its grease conveying bore 70 to a zerk-type pressure relief fitting 72. Thus, lubricant is again directed to the region adjacent the inner bearing. While not shown, it is also to be appreciated that the assembly of FIG. 3 would typically include a pair of zerk fittings in the outer surface of the hub portion 54 in the fashion of FIG. 1. These fittings, as before, permitting the lubrication of the outer bearings.

Figure 4:
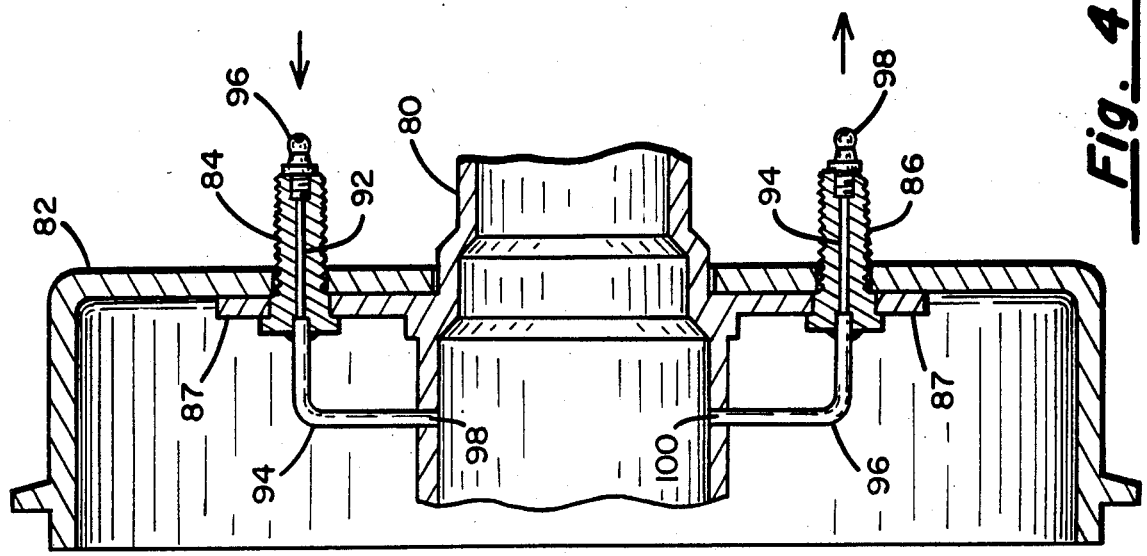
FIG. 4 shows a cross-section view of a brake drum and hub assembly including ported, press fit studs with tubular grease channels.

Turning attention next to FIG. 4, a cross-section view is shown through yet another embodiment of the invention. In this embodiment, the invention is combined with a typical knock-out type hub 80 and brake drum 82 that migt be encountered with trailers having electric brakes. For this embodiment, a pair of threaded studs 84 and 86 are press fit into the outer annular portion 87 of the hub 80 and mount through mating holes 88 provided in the surface of the brake drum 82. As in FIG. 1, lug nuts 10 mount to the studs 84 and 86 and secure the wheel 5 and tire thereto. In passing, it is also to be noted that the studs 84 and 86 could be threadably secured to the backing plate portion 87, if they were of that type.

As should be apparent from FIG. 4, the studs 84 and 86 have also been modified in a fashion similar to that of the lug bolts 64 and 66 of FIG. 3 so as to provide longitudinal grease channels 90 and 92 therethrough. Mounted now however to the rear of the studs 84 and 86 are short holow tubes 94 and 96 and which are in flow communication with the bores 92 and 94 of the respective studs 84 and 86. The opposite ends of the tubes 88 and 90, in turn, mount through ports 98 and 100 let into the hub portion 80 adjacent the space occupied by the inner bearing and, as before, ensure that grease is provided thereto. Thus, new grease is admitted via the upper zerk fitting 96 and is conveyed via the tube 94 to the rear bearing while old grease is caused to flow out through tube 96 and pressure relief valve 98.

From the foregoing embodiments of FIGS. 1 to 4, it should be apparent that the invention is adaptable to a variety of available wheel assemblies. Even though too the invention has been described with respect to various presently preferred embodiments, it is to be appreciated that still other modifications may be made thereto without departing from the spirit and scope of the invention and whereby a wheel's inner and outer bearings may be lubricated without removing the bearings form the hub. Accordingly, the following claims should be interpretted so as to include all those equivalent embodiments within the spirit and scope thereof.

What is claimed is:

1. Apparatus for lubricating a wheel hub having inner and outer axially spaced apart wheel bearings mounted within a sealed axle receiving cavity of the hub, said wheel bearings rotatively supporting the hub in relation to the axle, and said hub having inner and outer cylindrical hub portions extending orthogonally from opposite sides of a backing plate portion, said outer bearing mounting within said outer cylindrical hub portion and said inner bearing mounting within said inner cylindrical hub portion, comprising:
   (a) means mounted to said outer cylindrical hub portion in flow communication with the interior of said hub adjacent an inner surface of said outer wheel bearing for admitting lubricant to surround said outer wheel bearing; and
   (b) means accessible from the outer exposed surface of said wheel hub and including a first lubricant conveying channel in part external to the inner and outer cylindrical hub portions in flow communication with the interior of the inner cylindrical hub portion adjacent the inner surface of said inner wheel bearing for admitting a lubricant thereto under pressure to surround said inner wheel bearing.

2. Apparatus as set forth in claim 1 including means mounted to said outer cylindrical hub portion in diametrically opposed relation to said outer bearing lubricant admitting means for relieving the pressure within the hub cavity thereby assuring the filling of the hub interior adjacent said outer bearing.

3. Apparatus as set forth in claim 2 including means accessible from the outer exposed surface of said wheel hub and having a second lubricant conveying channel mounted in diametrically opposed relation to said first channel adjacent the inner surface of said inner bearing for relieving the pressure within the hub cavity thereby assuring the filling of the hub interior adjacent said inner bearing.

4. Apparatus as set forth in claim 1 wherein the inner bearing lubricating means comprises first and second channel containing standoffs weldably secured to the backing plate portion and to the inner cylindrical hub portion in diametrically opposed relation to one another, wherein a first zerk fitting mounts in flow communication through the outer surface of said backing plate portion to one end of the channel in said first standoff and the other end of the channel opening through the inner cylindrical hub portion adjacent said inner wheel bearing, and wherein the channel of said second standoff has one end opening through the inner cylindrical hub portion and the other end of the channel coupled to a pressure relief valve mounted through the outer surface of said backing plate portion.

5. Apparatus as set forth in claim 1 wherein the inner bearing lubricating means comprises:
   (a) first and second threaded members, each mounting through said backing plate portion and each having a longitudinal bore therethrough;
   (b) first and second channel containing members, each coupled to an inner end of one of the bores of said respective first and second threaded members at said backing plate portion and each having a lubricant conveying channel extending therefrom and opening through said inner cylindrical hub portion;

(c) a first zerk fitting mounted to the outer end of the bore of said first threaded member; and (d) a pressure relief fitting mounted to the outer end of the bore of said second threaded member.

6. Apparatus as set forth in claim 5 wherein said first and second threaded members each comprise a threaded stud bolt for securing a wheel to said backing plate portion and wherein said first and second channel members each comprise a hollow tube.

7. Apparatus as set forth in claim 5 wherein said first and second threaded members each comprise a removable lug bolt for securing a wheel to said backing plate and wherein said first and second channel members each comprise a hollow cavity formed as a part of said backing plate.

* * * * *